(12) United States Patent
Higaki

(10) Patent No.: US 8,929,002 B1
(45) Date of Patent: Jan. 6, 2015

(54) TANDEM TELEPHOTO LENSES

(71) Applicant: Robert Higaki, Watsonville, CA (US)

(72) Inventor: Robert Higaki, Watsonville, CA (US)

( * ) Notice: Subject to any disclaimer, the term of this patent is extended or adjusted under 35 U.S.C. 154(b) by 69 days.

(21) Appl. No.: 13/945,124

(22) Filed: Jul. 18, 2013

(51) Int. Cl.
*G02B 13/02* (2006.01)

(52) U.S. Cl.
CPC ...................... *G02B 13/02* (2013.01)
USPC .............. 359/745; 359/819; 248/170

(58) Field of Classification Search
USPC ......................................... 359/745
See application file for complete search history.

(56) References Cited

U.S. PATENT DOCUMENTS

| | | | |
|---|---|---|---|
| 4,751,540 A * | 6/1988 | Jones | 396/419 |
| 2014/0191094 A1 * | 7/2014 | Esarey | 248/170 |

* cited by examiner

*Primary Examiner* — James Jones
(74) *Attorney, Agent, or Firm* — Donald R. Boys; Central Coast Patent Agency, Inc.

(57) ABSTRACT

An apparatus has a plate having a length, a width and an attachment interface, two clamping mechanisms, each having a cross piece fastened orthogonally to the elongated plate, a bumper block formed under the cross piece, an inflexible strap joined the cross piece on one side of the elongated plate, and a first tightening mechanism enabled to draw the strap joined to the cross piece on an opposite side of the elongated plate. The attachment interface allows the cross piece of the clamping mechanisms to be assembled at a plurality of different positions along the length of the elongated plate, such that a distance between the two clamping mechanisms is adjustable, allowing the clamping mechanisms to be joined to a tubular barrel at two different positions of equal or differing diameter.

6 Claims, 3 Drawing Sheets

TANDEM TELEPHOTO LENSES

BACKGROUND OF THE INVENTION

1. Field of the Invention

The present invention is in the technical area of optical imaging apparatus and pertains more particularly to an apparatus for tandem mounting of two telephoto-lens equipped cameras.

2. Description of Related Art

It is well-known in the art that many tripods, mounting bases, adapters, and alignment devices exist for the support, operation, and mechanical adjustment of optical devices and sensors, including cameras. It is also well-known in the art that there are a variety of telephoto lens devices, essentially telescopes, that are commercially available and adaptable to cameras of many sorts for shooting still pictures and videos, often in outdoor settings. As an example, a photographer may wish to record images of a surfing competition from shore. The surfers will typically be far from shore and moving generally toward the shore, and telephoto lens with the camera and a steady tripod support will be essential for good photography.

There is, however, at least one problem in this and similar use cases. That is that the telephoto lens has a field of vision which will be adequate at a certain minimum distance and for some distance further away. But as the subject approaches closer, the subject will fill the field of vision of the particular telephoto lens in use. It is desirable for the photographer to be able to switch quickly from the telephoto lens and camera in use to a second telephoto lens and camera combination of lesser magnifying power having a broader field of vision, so images of the subject approaching may be continued to be recorded. It should be clear as well that the example may work in the other direction, for a subject receding, wherein the switch will be from the less powerful to the more powerful camera and lens setup.

What is clearly needed is an apparatus and arrangement that enables two (or more) lens-mounted cameras with lenses of differing power and field of vision to be closely associated and aligned such that the photographer, as a subject fills the field of vision of one, may quickly switch recording to lens-mounted camera with a greater filed of vision, to continue recording images.

BRIEF SUMMARY OF THE INVENTION

In an embodiment of the invention an apparatus is provided comprising an elongated plate having a length substantially greater than a width and an attachment interface, a first clamping mechanism comprising a first cross piece enabled to fasten to the elongated plate, below the plate and orthogonal to the plate at the attachment interface, at least one first bumper block formed of rubber or rubber-like material positioned under the first cross piece, a first inflexible strap joined to an anchor point of the first cross piece on one side of the elongated plate, and a first tightening mechanism joined to the cross piece on a side of the elongated plate opposite the anchor point, the first tightening mechanism enabled to engage and draw the first inflexible strap, and a second clamping mechanism comprising a second cross piece enabled to fasten to the elongated plate, below the plate and orthogonal to the plate at the attachment interface, at least one second bumper block formed of rubber or rubber-like material positioned under the second cross piece, a second inflexible strap joined to an anchor point of the cross piece on one side of the elongated plate, and a second tightening mechanism joined to the second cross piece on a side of the elongated plate opposite the anchor point, the second tightening mechanism enabled to engage and draw the inflexible strap.

The attachment interface of the elongated plate allows the first and second cross pieces of the first and second clamping mechanisms to be assembled to the elongated plate at a plurality of different positions along the length of the elongated plate, such that a distance between the first and second clamping mechanisms may be adjusted along the length of the elongated plate, allowing the first and second clamping mechanisms to be joined to a tubular barrel at two different positions of equal or differing diameter.

In one embodiment the attachment interface of the elongated plate comprises a plurality of threaded and or through holes spaced along the length of the plate such that the first and second clamping mechanisms may be adjusted in position relative to the plate and to one another. Also in one embodiment the elongated plate further comprises a second attachment interface enabled to mount a commercially-available mounting head for a telephoto lens.

Still in one embodiment the attachment interface of the elongated plate comprises two or more slots allowing the cross-pieces to be positioned at a variety of positions along the length of the elongated plate. Also in one embodiment each of the first and second clamping mechanisms further each comprise two rigid descending structural elements, the cross piece comprises an attachment interface for the cross piece allowing the descending elements to be spaced variably to each side of the elongated plate, and further comprising a strap of rubber-like stretchable material fastened across the descending elements, such that the descending elements, placed to span the barrel diameter of a telephoto lens, enable the rubber-like strap to be placed against the barrel, and engaging and drawing the inflexible strap stretches the strap of rubber-like flexible material to stretch and extend around a portion of the diameter of the barrel, and the elongated plate to move toward the barrel until the rubber-like strap contacts the stop block. In yet another embodiment stop blocks of different thickness are used in the two clamp assemblies allowing the elongated plate to remain parallel to an axis of the barrel of the telephoto lens with the two clamp assemblies clamped to the barrel at positions of different diameter.

DETAILED DESCRIPTION OF THE INVENTION

Figure 1:
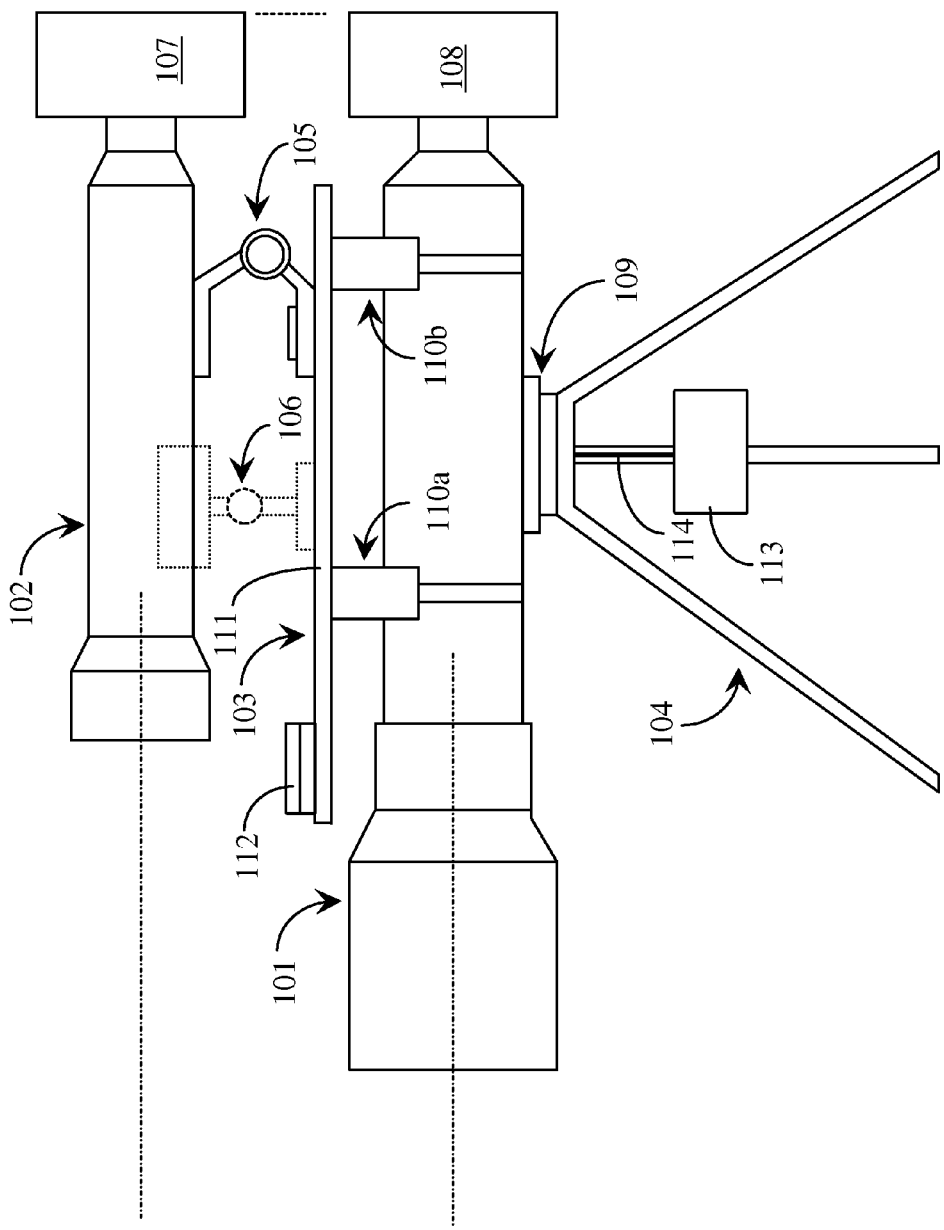
FIG. 1 is an elevation view of an assembly of apparatus according to an embodiment of the present invention.

FIG. 1 is an elevation view of an assembled mounting apparatus 103 according to an embodiment of the present invention. In this example a dual camera/lens arrangement is mounted on a commercially-available mounting head 109 atop a commercially-available adjustable tripod apparatus 104. A first telephoto lens 101 coupled to a camera 108 is mounted to head 109, and a second telephoto lens 102 having a broader field of vision coupled to a camera 107 is mounted to the first telephoto lens by a mounting apparatus 103 according to an embodiment of the present invention. Mounting apparatus 103 is joined in this example to a plate 111 of apparatus 103 by two separate clamping assemblies 110a and 110b. Detail of the unique mounting apparatus 103 is provided in descriptions below. A commercially-available mounting head 105 supports the second telephoto lens upon apparatus 103, and optionally a secondary support and adjustment 106 is provided as well.

There are several rather important aspects in the exemplary arrangement illustrated in FIG. 1. One is that cameras 107 and 108 need to be at least approximately aligned at the camera end of the assembly, because the photographer must view through the lenses and manage the operation of the cameras and apparatus. Another is that the two lenses need to have their centerlines aligned and rather closely parallel to be able to view and record images of a same subject. Yet another is that the overall center of gravity of the whole assembly needs to be substantially over the vertical centerline of the tripod, which is affected by the need to have the cameras approximately aligned.

An important purpose of apparatus 103 is that it may be assembled to any of a variety of models from the same or different manufacturers of telephoto lenses like lens 101, and may be stable, and may be quickly, easily and reliably assembled for use and disassembled for storage or transport.

It is well-known that different telephoto lenses may have different body diameters, variable body diameters, and structures that may limit where one may attach an apparatus like unique mounting apparatus 103. Therefore it is desirable that clamping assemblies 110a and 110b in this example, be able to translate to different positions relative to plate 111, so that the spacing between the elements 110a and 110b may be varied, allowing attachment to different telephoto lenses.

Figure 2:
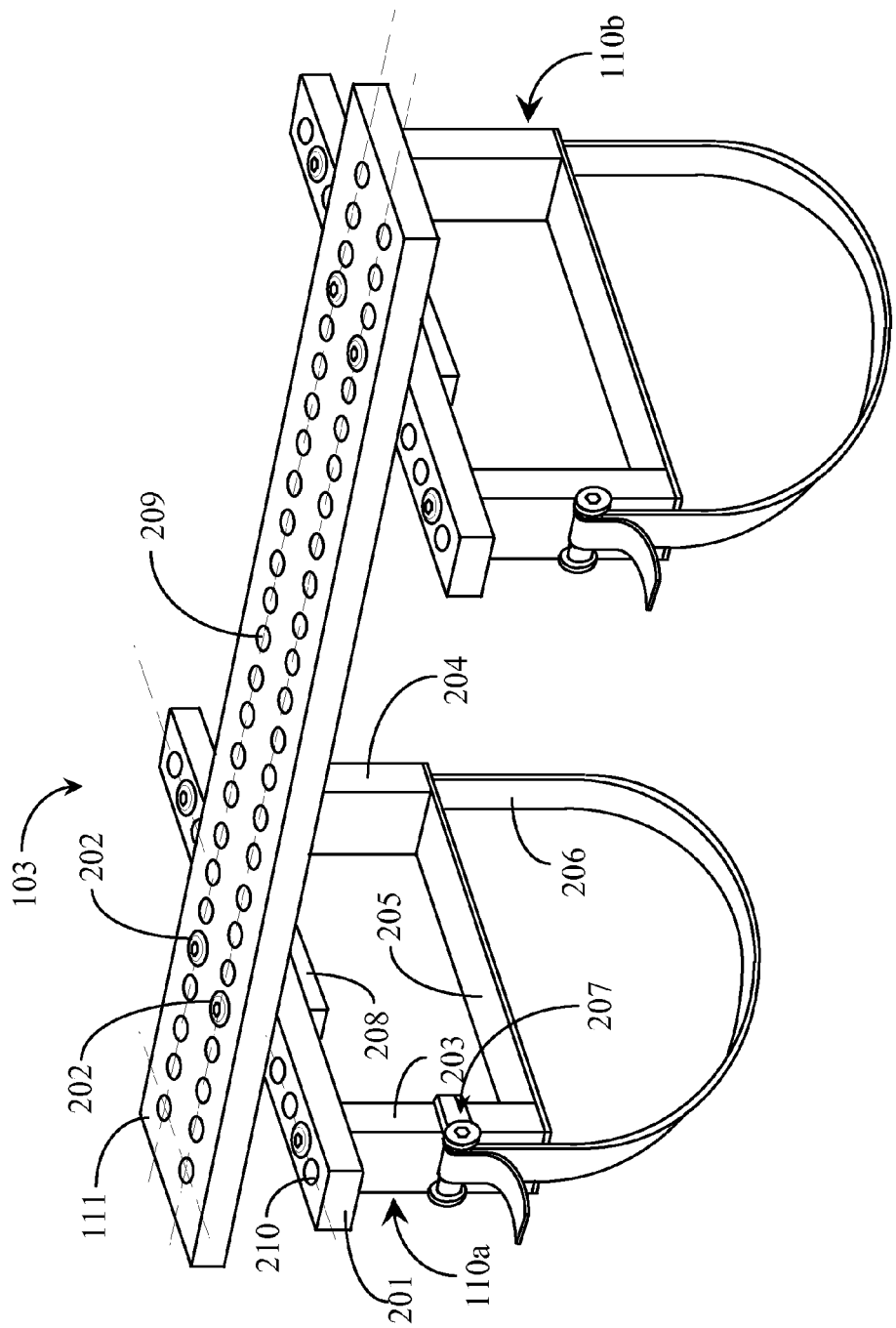
FIG. 2 is a perspective view of mounting apparatus 103 in one embodiment of the present invention.

FIG. 2 is a perspective view of mounting apparatus 103 in one embodiment of the present invention, illustrating mounting elements 110a and 110b attached to plate 111, and supporting elements. Mounting head 105 is not shown in this view.

In the example shown, plate 11 is a rectangular plate having two rows of holes 209, the purpose of which is to provide a variety of mounting positions for clamping assemblies 110a and 110b, which in different use cases may have to have a different spacing to be able to clamp to a convenient place on a super telephoto lens. In alternative embodiments there may be slots rather than spaced holes.

Clamping assemblies 110a and 110b are in this embodiment nearly identical in the elements depicted, which may be assembled a bit differently depending at least in part on the diameters of the two places where the clamping assemblies will encircle and clamp to the body of a super telephoto lens. Assembly 110a has element numbers, which will be the same for clamping assembly 110b.

Referring now to assembly 110a, there is a cross-piece 201 fastened orthogonally to plate 103 and centered, fastened to plate 103 by two button-head screws 202. Cross piece 201 is of a length to equal the largest expected diameter of a barrel of a super telephoto lens to which assembly 103 might be mounted. Holes 210 in cross piece 201 at the position for fastening the cross piece to plate 103 are threaded for the purpose, while other holes 210 are unthreaded through holes. Two descending members 203 and 204 are fastened to cross piece 201 also in this example by button-head screws. One row of holes in cross piece 201 might let members 203 and 204 turn relative to the cross piece, but there are in this embodiment pins between elements 203 and 201 and 204 and 201 that fixate members 203 and 204 to cross piece 201. In assembly of descending members 203 and 204, the members are positioned and fastened to cross piece 201 at a spacing that is a bit greater than the diameter of the barrel of the super telephoto lens to which mounting apparatus 103 is to be applied. In this way descending members 203 and 204 will pass to each side of the barrel of the super telephoto lens.

A rubber or rubber-like polymer strip 205, stretchable with a substantial spring rate is fastened between members 203 and 204 as shown. Further, a strong fabric strap 206 is fastened securely to descending element 204, and proceeds to a ratchet mechanism 207 fastened to descending element 203, such that the fabric strap may be shortened or lengthened to clamp to the barrel of the super telephoto lens (not shown). This fabric strap may be woven nylon or other material, and in some embodiments may be impregnated or coated with a rubber-like material for a high-friction interface toi a barrel of a telephoto lens.

Finally a rubber or rubberlike stop block 208 positioned centrally under cross-piece 201 serves to abut the barrel of the super telephoto lens as strap 206 I tightened. Further, for a small-diameter part of a barrel, wherein members 203 and 204 may be closely spaced, strap 205 may be loose. At a wider spacing it may be necessary to stretch strap 205 somewhat. This will not seriously affect the utility of the clamping.

As it is desirable that plate 111 be parallel the central axis of telephoto lens 101, a stop block of a greater thickness may be used for a smaller diameter barrel position, to compensate for the difference in barrel diameter at the two positions where clamping apparatus 110a and 110b are placed. One need only measure the diameters, and select the stop blocks accordingly, where the difference in thickness of the stop blocks will be one-half the difference in diameter of the barrel at which the clamping apparatuses are placed.

Figure 3:
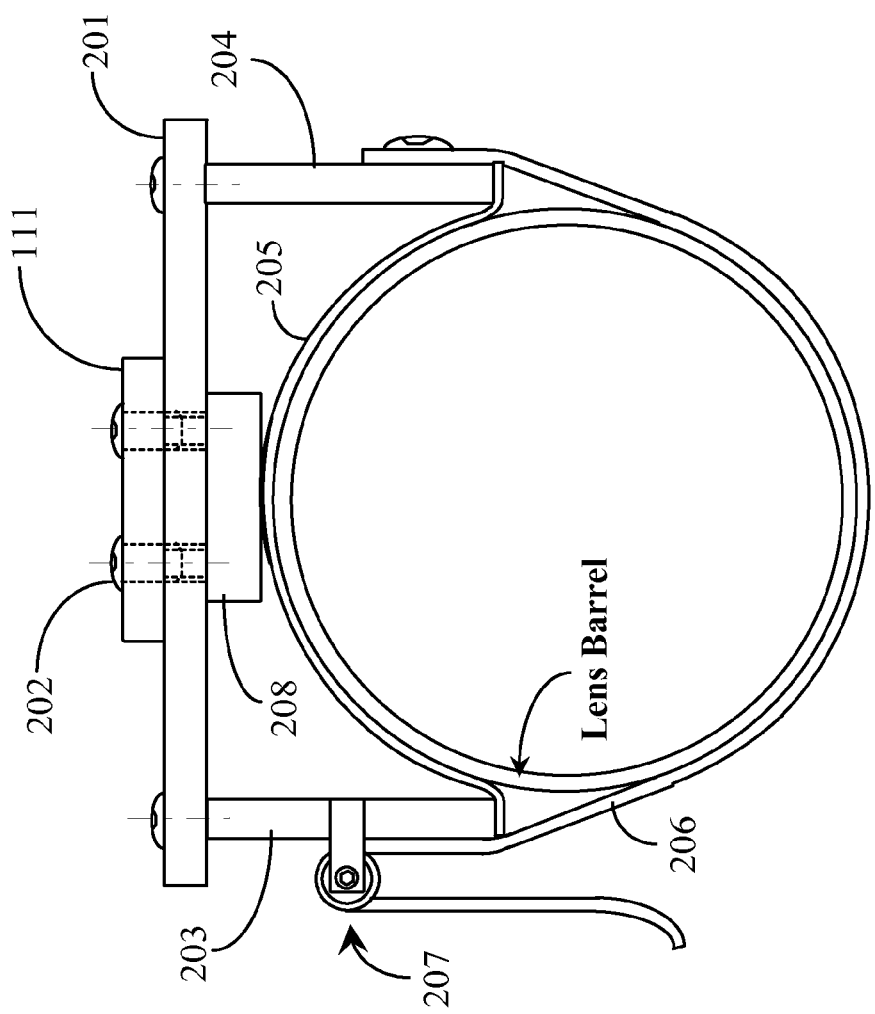
FIG. 3 is a straight-on view in the direction of the central axis of a super telephoto lens, showing a cross-section of the lens barrel and a clamping apparatus securely fastened according to an embodiment of the invention.

FIG. 3 is a straight-on view in the direction of the central axis of a super telephoto lens, showing a cross-section of the lens barrel and clamping apparatus 110a securely fastened according to an embodiment of the invention. Descending elements 203 and 204 have been positioned relative to cross piece 201 to span the lens barrel at the position along the lens barrel that it is desired to clamp the mounting apparatus, fabric strap 206 has been wrapped below the lens barrel and up through ratchet mechanism 207, and tightened to draw the mounting apparatus at this position down onto the lens barrel and securely anchor it there. As fabric strap 206 is tightened, strap 205 stretches, and the apparatus is drawn down on the lens barrel until rubber stop 208 contacts the lens barrel and may deform slightly. Mounting apparatus 103 is held to the lens barrel by a considerable length of fabric strap 206 under tension, which strap may be impregnated with a high friction material, rubber-like strap 205 stretched considerably, also having a high friction surface, and rubber stop 208. The joining of apparatus 203 to the lens barrel is strong and secure, and may be accomplished rather handily. Stop 208 may be selected from a variety of stops of different thickness to provide a dimension from the top of plate 111 to the centerline of the barrel that may be duplicated at the position that clamping assembly may be affixed to the lens barrel at perhaps a point having a different outside diameter, simply be selecting a stop of a different and appropriate thickness for clamping assembly 110b. Thusly plate 111 may be maintained level and parallel with the centerline of the lower telephoto lens in assembly.

The skilled person will be aware that the exemplary embodiment shown and described in enabling detail here is one example of a variety of ways that the functions of the mounting apparatus may be accomplished. There are many variations that may be made without departing from the inventive concept.

As an after-market product the inventor expects the product to be provided as a kit, with parts to be assembled to accommodate telephoto lenses that may be in the possession of and used by a person needing to mount one lens above another as described in this specification. There may be cross pieces 201 of different lengths in such a kit. There may be rubber stops of different thicknesses. There may be fabric straps of different lengths. There may be alternative fasteners and the like.

In use a photographer will likely have a particular super telephoto lens, as seen as element 101 in FIG. 1, and will use this particular lens on repeated occasions. So, once having selected the proper pieces and assembled mounting apparatus to that telephoto lens, the photographer may discretely mark he two positions on the barrel that clamps 110a and 110b meet the barrel, so the assembly may be disassembled and transported and reassembled rather easily and quickly. The positions of descending elements 203 and 204 on the cross pieces 201 need not be changed again, and stops 208 need not be changed again to disassemble, transport or store, and reassemble again for use as a dual telephoto lens. And in reassembly plate 201 will be parallel with the centerline of the lower telephoto lens, so with commercial head 105 fastened to plate 111, and upper telephoto lens 102 mounted to head 205, the centerline of the upper lens will be substantially parallel to that of the lower lens.

The skilled person will understand that commercial head 105 may be any one of a variety of such devices, and many if not all have adjustment that may be used to fine tune the direction of the upper lens to match to the direction desired relative to the lower lens. Upper plate 111 of mounting apparatus 103 may be designed to accommodate just one such head 105, and two or more different heads. In a further embodiment of the invention, and entirely optionally, a separate support 106 may be provided, mounting to plate 111, for additional support and at least rough adjustment of position and direction of an upper lens. This support may have a cradle to carry the upper lens at a position on its barrel, and a vertical adjustment to provide a proper dimension between the upper surface of plate 111 and the barrel of the upper lens. In most situations such a support will not be needed, because the position of the mounting point on the barrel of the upper lens will be provided by the manufacturer such that the center of gravity of the upper lens will be over commercial head 105, and there will be no need for support 106.

It is desirable in use that the entire assembly of tripod 104, lower lens 101, mounting apparatus 103 and upper lens 102 be stable, requiring that the center of gravity of all of the elements above the tripod be substantially over the vertical centerline of the tripod. As described above, the requirement that upper lens 102 be positioned so that camera 107 attached to that lens by aligned substantially with camera 108 of lower lens 101 may affect this center of gravity adversely.

In one embodiment of the invention plate 111 may have sufficient length away from the camera ends of the assembled apparatus such that one or more weights 112 may be added to move the center of gravity of the assembled apparatus toward that end to lie more directly over the vertical centerline of the tripod. In another embodiment a weight 113 may be provided to be suspended by a tether 114 below lower head 109 on the centerline of the tripod. In some embodiments this weight may be provided by a container that may be filled with sand, water, or other available material such a gravel at a site of use.

Again, the skilled person will be aware that the exemplary embodiments shown and described in enabling detail in this specification are in fact exemplary of a variety of other embodiments that do not vary from the inventive concept. The scope of the invention is limited only by the claims that follow.

The invention claimed is:

1. An apparatus, comprising:
an elongated plate having a length substantially greater than a width and an attachment interface;
a first clamping mechanism comprising a first cross piece enabled to fasten to the elongated plate, below the plate and orthogonal to the plate at the attachment interface, at least one first bumper block formed of rubber or rubber-like material positioned under the first cross piece, a first inflexible strap joined to an anchor point of the first cross piece on one side of the elongated plate, and a first tightening mechanism joined to the cross piece on a side of the elongated plate opposite the anchor point, the first tightening mechanism enabled to engage and draw the first inflexible strap; and
a second clamping mechanism comprising a second cross piece enabled to fasten to the elongated plate, below the plate and orthogonal to the plate at the attachment interface, at least one second bumper block formed of rubber or rubber-like material positioned under the second cross piece, a second inflexible strap joined to an anchor point of the cross piece on one side of the elongated plate, and a second tightening mechanism joined to the second cross piece on a side of the elongated plate opposite the anchor point, the second tightening mechanism enabled to engage and draw the inflexible strap;
wherein the attachment interface of the elongated plate allows the first and second cross pieces of the first and second clamping mechanisms to be assembled to the elongated plate at a plurality of different positions along the length of the elongated plate, such that a distance between the first and second clamping mechanisms may be adjusted along the length of the elongated plate, allowing the first and second clamping mechanisms to be joined to a tubular barrel at two different positions of equal or differing diameter.

2. The apparatus of claim 1 wherein the attachment interface of the elongated plate comprises a plurality of threaded and or through holes spaced along the length of the plate such that the first and second clamping mechanisms may be adjusted in position relative to the plate and to one another.

3. The apparatus of claim 1 wherein the elongated plate further comprises a second attachment interface enabled to mount a commercially-available mounting head for a telephoto lens.

4. The apparatus of claim 1 wherein the attachment interface of the elongated plate comprises two or more slots allowing the cross-pieces to be positioned at a variety of positions along the length of the elongated plate.

5. The apparatus of claim 1 wherein each of the first and second clamping mechanisms further comprise two rigid descending structural elements, the cross piece comprises an attachment interface for the cross piece allowing the descending elements to be spaced variably to each side of the elongated plate, and further comprising a strap of rubber-like stretchable material fastened across the descending elements, such that the descending elements, placed to span the barrel diameter of a telephoto lens, enable the rubber-like strap to be placed against the barrel, and engaging and drawing the inflexible strap stretches the strap of rubber-like flexible material to stretch and extend around a portion of the diameter of the barrel, and the elongated plate to move toward the barrel until the rubber-like strap contacts the stop block.

6. The apparatus of claim 1 wherein stop blocks of different thickness are used in the two clamp assemblies allowing the elongated plate to remain parallel to an axis of the barrel of the telephoto lens with the two clamp assemblies clamped to the barrel at positions of different diameter.

\* \* \* \* \*